United States Patent
Best

[19]

[11] Patent Number: 5,865,634
[45] Date of Patent: Feb. 2, 1999

[54] CLOCKSPRING CONNECTOR WITH CARRIER MEMBER

[76] Inventor: Gary Best, #3 Marrae Ct., Hamilton, Ill. 62341

[21] Appl. No.: 667,634

[22] Filed: Jun. 24, 1996

Related U.S. Application Data

[63] Continuation of Ser. No. 276,954, Jul. 19, 1994, abandoned.

[51] Int. Cl.[6] .................................................. H01R 35/04
[52] U.S. Cl. ............................................ 439/164; 439/15
[58] Field of Search ....................................... 439/164, 15

[56] References Cited

U.S. PATENT DOCUMENTS 3,763,455  10/1973  Confer et al. .
4,502,746   3/1985  Wawra et al. .
4,722,690   2/1988  Priede ........................................ 439/15
4,797,109   1/1989  Wende ....................................... 439/15
5,046,951   9/1991  Suzuki ....................................... 439/15
5,171,157  12/1992  Bolen ....................................... 439/164
5,277,604   1/1994  Ida et al. ................................. 439/164
5,310,356   5/1994  Obata et al. .............................. 439/15
5,328,112   7/1994  Obata ....................................... 242/388

Primary Examiner—Gary F. Paumen
Attorney, Agent, or Firm—David L. Newman

[57] ABSTRACT

A clockspring connector is provided comprising a housing defining a chamber, including a carrier member having a first roller associated with a first turned-back loop of a first flat conductor cable and a second roller associated with a second turned-back loop of a second flat conductor cable wherein said first and second flat conductor cables are alternatingly coiled at an inner diameter of the chamber adjacent the hub or along said outer diameter of the chamber adjacent the housing wall.

17 Claims, 3 Drawing Sheets

CLOCKSPRING CONNECTOR WITH CARRIER MEMBER

This is a continuation of application Ser. No. 08/276,954, filed Jul. 19, 1994, now abandoned.

BACKGROUND OF THE INVENTON

This invention pertains to a clockspring connector for enclosing electrical conductor cables, the clockspring connector electrically connecting a rotatable electric device with a stationary electric device.

While the present invention may have multiple applications, the most prevalent is for use in automobiles. An increasing number of automobiles have airbag crash systems. An airbag is typically located on the steering wheel facing the driver. The airbag must be in continuous electrical connection with sensors in the car body. The sensors provide an electrical signal to the airbag crash assembly which instantly inflates the airbag in the event of a crash. Accordingly, there is a need for an electrical connection between the rotatable portion of the airbag assembly which is mounted to the steering wheel, and the remaining portion of the assembly which is in a stationary position in the car body. Electrical connections between rotatable and stationary parts are well known. Typically, an electrical brush rests upon a conductive ring, with one of the parts being rotatable to provide such rotatable electrical connection. However, there is a risk, particularly during the impact of an accident, of a transient failure of electrical connection with a brush and ring system which result in failure of the entire airbag system crash assembly.

Accordingly, a clockspring connector has previously been developed, comprising an outer housing, a rotor member and a multiple of intermediate housing members for enclosing and connecting the members; the housing and rotor member rotatably associated with one another at a plurality of bearing surfaces. A "clockspring" is located inside the interconnector. The clockspring of prior art devices includes a single flat conductor cable having its ends conductively attached to conductor wires which pass out of the interconnector to unite the airbag to the sensing device. For example, U.S. Pat. No. 5,061,195 discloses a clockspring housing and assembly having a single flat conductor cable therein.

It has also been known in the art to reduce the length of the flat conductor cable in order to reduce cost and needed space within the clockspring housing. For example, U.S. Pat. No. 5,277,604 incorporates an assembly of at least eight rollers and turned-back portions of the flat conductor cable within the clockspring housing to decrease the length of the flat cable and also prevent buckling and enhance reliability and smooth rotation of the clockspring connector. Such a design requires a complex and expensive system of mounting the rollers. Such a design may be expensive and, as well, only accommodates a single flat conductor cable.

The use of a pair of conductor cables was disclosed in U.S. Pat. No. 3,763,455. The conductor cables were carried by an assembly of twenty spacers or rollers. This design also requires a multiplicity of parts, including numerous rollers which add to the assembly time and costs of the device.

As more controls are mounted on the steering wheel, more conductors are required to pass multiple electrical signals through the clockspring connector. Prior art clocksprings have included conductor cables having up to six conductors in each flat cable. The excess of six conductors is limited by the limited width of the flat conductor cable and the processing methods of manufacturing the flat cable. Accordingly, there is needed a clockspring connector which can accommodate more than six conductors.

It is another object of the present invention to provide a clockspring connector having a minimal amount of moving parts.

It is a further object of the present invention to provide a clockspring connector having flat conductor cable of minimal length.

It is another object of the present invention to provide a clockspring having a freely and independently rotating carrier member.

SUMMARY OF THE INVENTION

The above objects and advantages are provided by a clockspring connector comprising a housing defining a chamber extending therethrough. A carrier member positioned within the chamber having two rollers. Flat conductor cable carried by the carrier member. The flat conductor cable having a first turned-back loop section associated with a first roller and a second turned-back loop section associated with a second roller. A first flat cable associated with the first roller and a second flat cable associated with the second roller. A hub having an inner diameter exit cavity for receiving the flat conductor cable. Whereupon rotation of the hub in a clockwise direction causes the first flat conductor cable to unwind from the hub and push against the carrier wall adjacent the first roller and simultaneously the second flat cable unwinds off of the hub and pushes against the second wall of the carrier member adjacent the second roller causing the carrier member to rotate in a clockwise direction and to transfer the first and second flat cables from the hub to the outer diameter of the housing. Rotation of the hub in the counterclockwise direction causes the first flat cable to pull on the first roller and the second flat cable to pull on the second roller causing the first and second flat cables to unwind from the outer diameter of the chamber and simultaneously causing the carrier member to rotate in a counterclockwise direction.

A housing member receives the hub, the carrier member is mounted on the hub, and a cover encloses the carrier member and flat cables within the housing. The cover having an outer diameter exit cavity.

These and other features of the invention are set forth below in the following detailed description of the presently preferred embodiments.

DETAILED DESCRIPTION OF THE PRESENTLY PREFERRED EMBODIMENTS

Figure 1:
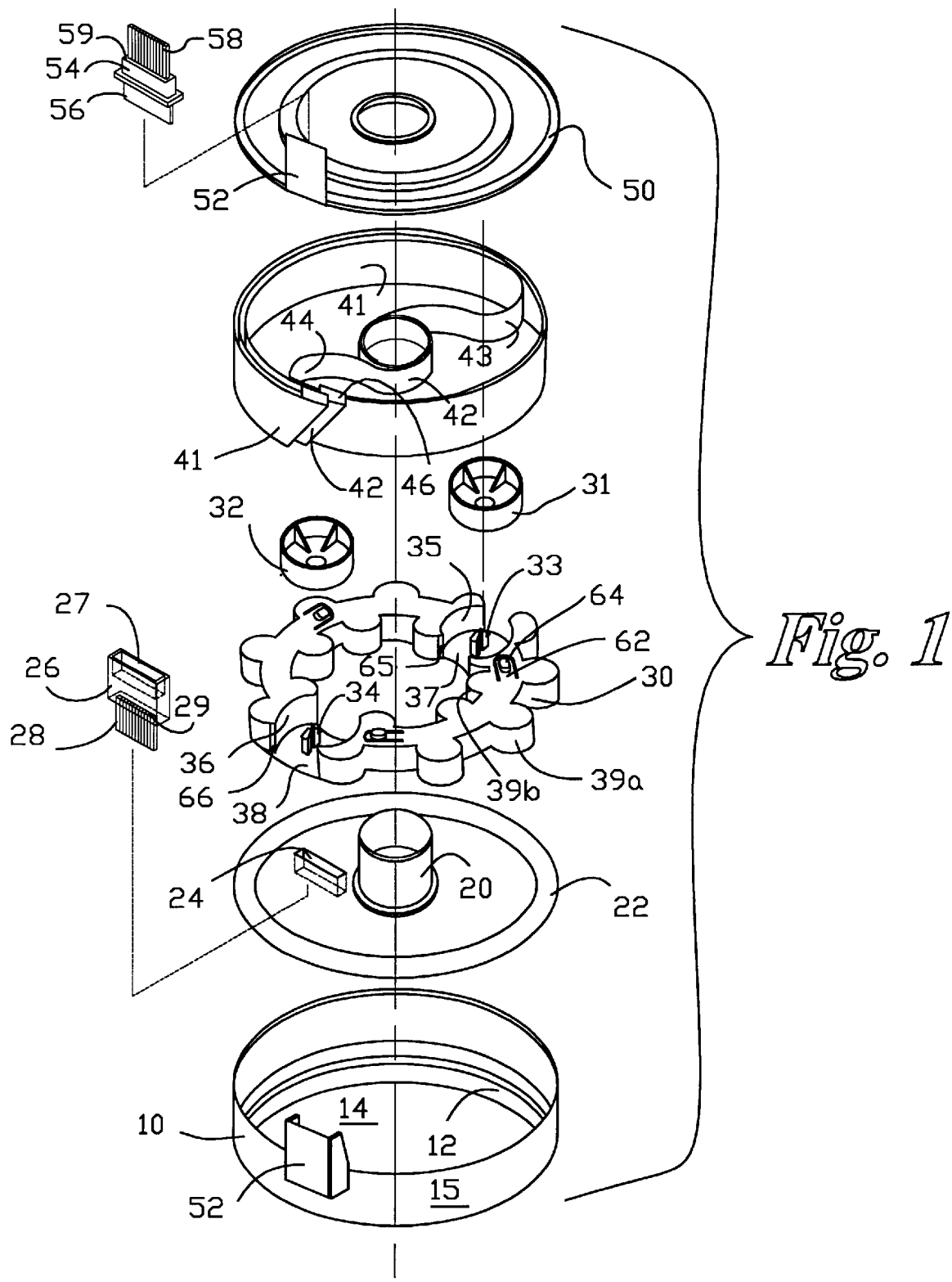
FIG. 1 is an exploded perspective view of a clockspring connector.
Figure 2:
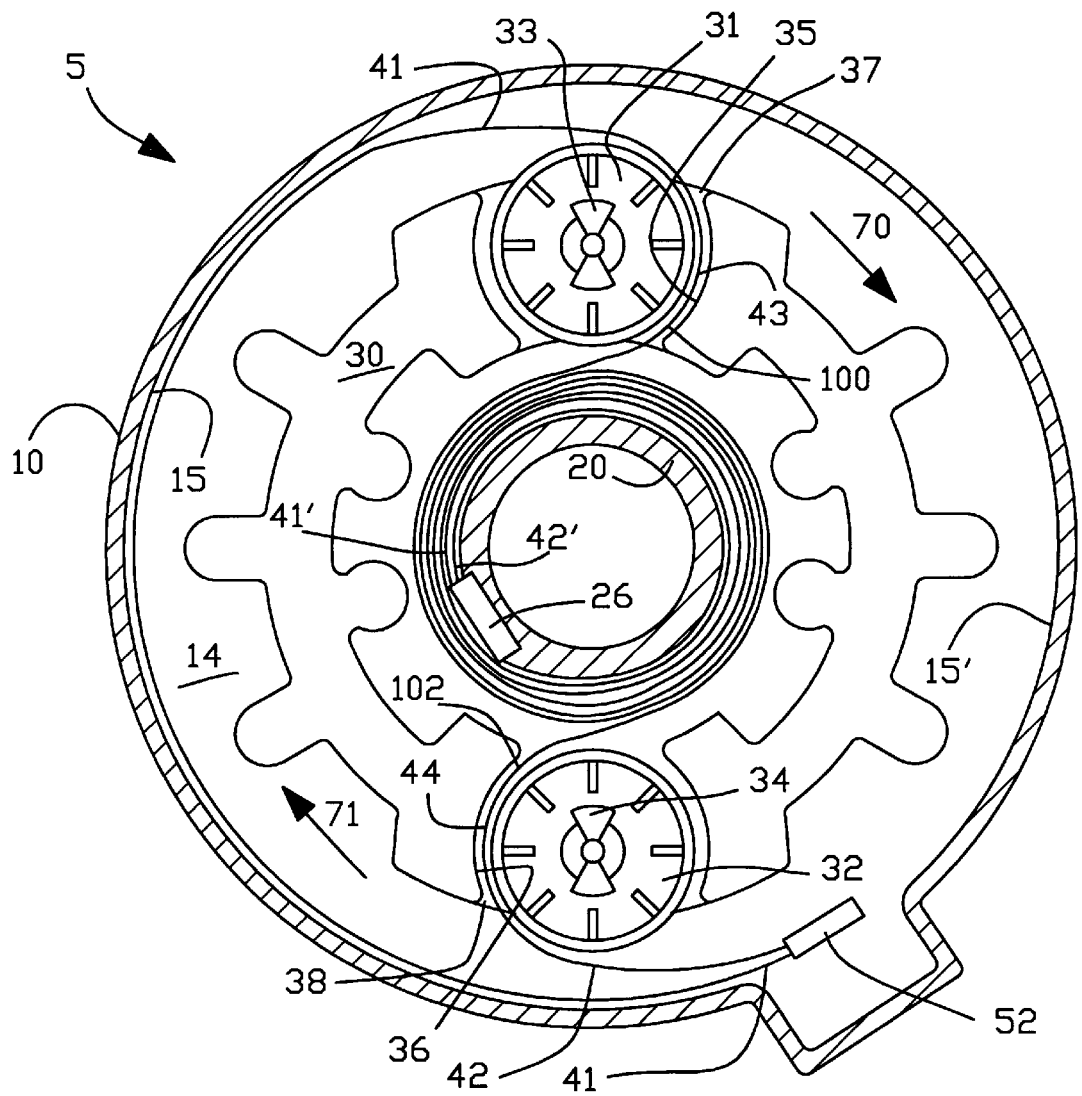
FIG. 2 is a top view of a clockspring connector in a fully wound position.
Figure 3:
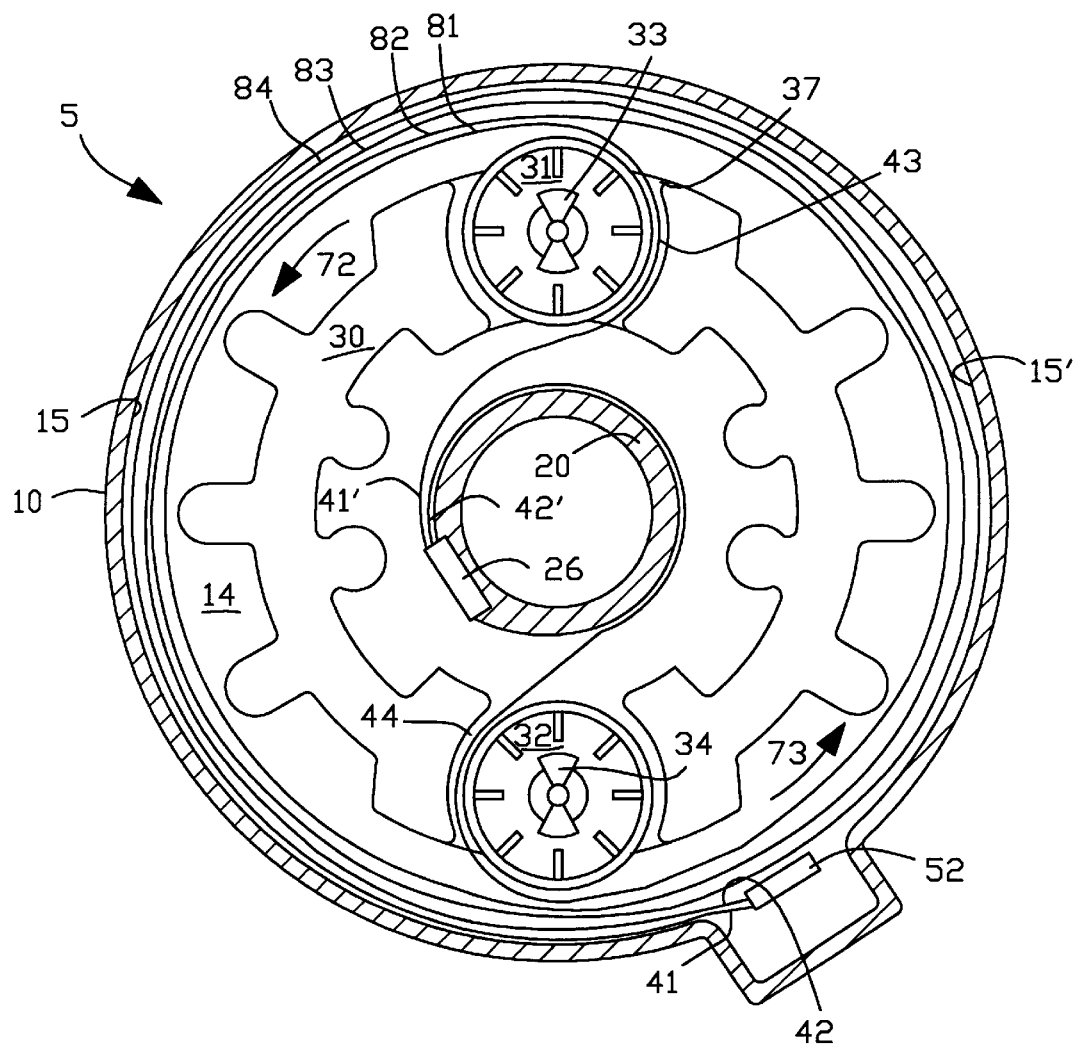
FIG. 3 is a top view of clockspring connector in a fully unwound position.

The clockspring connector of this invention is better understood by references to FIGS. 1–3 which show various aspects of a presently preferred clockspring connector. Turning to FIG. 1, a housing 10 receives a hub 20. Mounted on the hub is a carrier member 30. A first flat conductor cable 41 and a second flat conductor cable 42 is carried by the carrier member 30. A cover 50 encloses the flat cables 41, 42, carrier member 30 and hub 20 within housing 10.

The housing 10 includes a ledge 12 upon which the base 22 of hub 20 rests. The hub 20 and housing 10 are constructed of materials which allow the hub 20 to freely rotate within the housing 10 and to reduce the amount of friction between the base 22 and ledge 12 to the greatest extent. Materials such as a teflon tape, silicon material or grease may be inserted between the base 22 and ledge 12 in order to reduce friction at these bearing surfaces and all other bearing surfaces of the present invention. An inner diameter exit cavity 24 protrudes downwardly from the base 22 of hub 20. Inserted within the inner diameter exit cavity 24 is inner diameter backbone 26. The inner diameter backbone 26 receives flat conductor cable at its entrance end 27 and insulated wires 28 protrude from the exit end 29.

Mounted on the hub 20 and freely and independently rotatable thereon is carrier member 30. The carrier member 30 is generally a spherically shaped member being molded of a thermoplastic polymer material in the presently preferred embodiment. However, any material may be used to form the carrier member 30. The carrier member 30 includes a first roller mounting area 37 and a second roller mounting area 38. Axles 33,34 protrude upwardly from the roller mounting areas 37,38, respectively. Roller area walls 35,36 surround the roller areas 37,38 and are correspondingly shaped to the outer diameter of first roller 31 and second roller 32. Inner diameter corner 65 and outer diameter corner 66 are located at each end of roller area walls 36,36. The total circumference of roller area walls 36,36 may be controlled by changing the shape of corners 65,66 in order to control the path of the conductor cables 41,42. By rounding corners 65,66, the circumference of walls 35,36 is reduced and the area which contacts the conductor cables 41,42 is also reduced. By extending and bringing corners 65,66 to a point, the circumference of walls 35,36 is increased which increases the surface area which contacts conductor cables 41,42.

First roller 31 is mounted on axle 33 and second roller 32 is mounted on axle 34 of the carrier member 30. The first and second rollers 31,32 rotate freely and independently on their axles 33,34. A multiplicity of nubs 39*a* and 39*b* protrude from around the carrier member 30 toward the hub 20 or housing wall 15 and provide a surface against which the conductor cables 41,42 may rub and rotate against. The carrier member 30 provides a member for mounting rollers 31,32 and separating the conductor cables 41,42 along the outer diameter of the chamber 14 from the conductor cables 41,42 at inner diameter of the chamber 14. Spring members 62 are molded into the carrier member 30. Spacers 64 protrude from spring members 62 and help to keep the carrier member 30 positioned axially within the clockspring housing chamber 14. The housing chamber 14 is defined by the housing wall 15 around the circumference of the housing 10. The chamber 14 is further defined by the hub base 22 at its bottom and cover 50 at the top.

The present invention includes two flat conductor cables. A first conductor cable 41 and second conductor cable 42 are adjacently coiled around carrier member 30 within chamber 14 of the housing 10. The flat cables 41,42 of a preferred embodiment of this invention are formed by laminating six conductors parallel to each other with a pair of insulating films one each side. The use of two flat cables 41,42 having six conductors each provides for a total of twelve conductors carried by the preferred embodiment of this invention. It is within the scope of the present invention that more than two conductor cables could be carried by the present embodiment in order to increase the number of conductors to an almost limitless combination. The first conductor cable 41 includes first turned-back U-shaped loop section 43 and second conductor cable 42 includes second turned-back U-shaped loop section 44. First and second conductor cables 41,42 exit the clockspring at the outer diameter through the outer diameter exit cavity 52. Conductor cable tails 46 are folded perpendicularly to the path of the conductor cables within the chamber 14 and are received by the outer diameter exit cavity 52. Outer diameter backbone 54 is received from the other end of the outer diameter exit cavity 52 from the conductor cable tails 46. Entrance cavity 56 of the outer diameter backbone 54 receives the first and second conductor cables 41,42. The conductors of the cables 41,42 are welded to the corresponding insulated wires 58 which protrude from the exit end 59 of outer diameter backbone 54.

Assembly of the clockspring connector having the hub 20 adjacent the housing 10 occurs in order to allow for the easiest and quickest possible assembly of the clockspring connector. While the hub 20 includes the exit cavity 24 at the inner diameter, the hub 20 is the rotatable member which is associated with the steering wheel of an automobile. Rotation of the steering wheel of the automobile simultaneously rotates the hub 20. The cover 50 having exit cavity 52 at its outer diameter is placed onto the housing 10 and is the stationary member of the clockspring connector. The exit cavity 52 at the outer diameter is associated with the steering column of an automobile and is stationary. Thus, although FIG. 1 shows assembly of the clockspring connector having the inner diameter exit cavity 24 on the bottom and the outer diameter cavity 52 at the top of the assembly; when the clockspring connector is assembled to a steering assembly, it will be inverted so that the inner diameter exit cavity 24 and hub 20 are on the top of the clockspring connector and the outer diameter exit cavity 52 and cover 50 are on the bottom of the clockspring connector.

Operation of the clockspring can more easily be understood by viewing FIG. 2. The housing 10 has mounted therein carrier member 30 and hub 20. Mounted on the carrier member 30 is first roller 31 and second roller 32. The clockspring connector is shown in the fully wound position having the majority of the conductor cables 41,42 coiled around the hub 20 at the inner diameter of the chamber 14. First roller 31 is mounted in roller area 37 on axle 33 of the carrier member 30. Second roller 32 is mounted in second roller area 38 on axle 34 of the carrier member 30. First conductor cable 41 exits the outer diameter backbone 54 and coils adjacent to the outer diameter wall 15 of the housing 10. First turned-back loop section 43 then coils around first roller 31 and then coils around the hub 20. Second flat conductor cable 42 exits the outer diameter backbone 52 and at second turned-back loop 44, coils around second roller 32 and then onto hub 20 from the opposite side, 180° from the position where the first conductor cable 41 coils onto the hub 20. First conductor cable 41' terminates at the inner diameter backbone 26, adjacent second flat conductor cable 42'.

The rotational movement of the steering wheel is transmitted to the clockspring connector through the hub 20 and inner diameter backbone 26. Rotation in the clockwise direction or in direction of arrows 70,71 causes the first flat conductor cable 41 to unwind off of hub 20 and move to the right at position 100 and rub against wall 35 of the first roller area 37 of the carrier member 30. Simultaneously, second flat conductor cable 42 unwinds from hub 20 at point 102 and protrudes and rubs against wall 36 of second roller area 38 of carrier member 30. As the hub continues to unwind in the clockwise direction, the conductor cables 41,42 push against walls 35,36 and force the carrier member 30 also to rotate clockwise. As the hub 20 and carrier member 30 rotate clockwise, the first flat conductor cable 41 is spooled out from first roller 31 to completely encircle the outer diameter of the chamber 14 adjacent the wall 15 of the housing 10. Simultaneously, the second flat conductor 42 is spooled out along second roller 32 at a position 180° from the first conductor cable 41, to provide a second coil layered adjacently to the first conductor cable 41 at the outer diameter of the chamber 14. Rotation of the hub and carrier member 30 continue in the clockwise direction until the flat cables 41,42 are completely unwound from the hub 10.

The completely unwound condition is shown in FIG. 3. Like numerals for like elements of FIG. 2 are shown in FIG. 3. The clockspring connector 5 is shown in a completely unwound position, i.e., the flat conductor cables 41,42 are not coiled around hub 20. To wind the clockspring connector, the hub 20 is rotated in a counter-clockwise direction in the direction in the direction of arrows 72,73. Upon rotation of the hub 20 in a counter-clockwise direction, the first flat cable 41 pulls on the first roller 31 at first turned-back loop 43 causing the first roller 31 to rotate. Simultaneously, second conductor cable 42 pulls on second roller 32 at second turned-back loop 44 causing the second roller 32 to rotate in clockwise direction. The pulling of the first cable 41 and the second cable 42 on the first and second rollers 31,32 causes the carrier member 30 to rotate in a counter-clockwise direction. As the hub 20 and carrier member 30 continue to rotate counter-clockwise, the first and second conductors 41,42 are uncoiled from the outer diameter of the chamber 14 and become coiled again onto the hub 20. It can be seen that in the completely unwound position, the coils are positioned along the outer diameter of the chamber 14 in a first layer 81, a second layer 82, a third layer 83, and a fourth layer 84. The first conductor cable 41 and the second conductor cable 42 are alternatingly layered; wherein first layer 81 and third layer 83 are the first conductor cable 41 and the second layer 82 and fourth layer 84 are the second conductor cable 42. Upon the first rotation of the hub 20 in the counter-clockwise direction, layer 81 is taken up from the outer diameter of the chamber onto the hub 20 by first roller 31. Simultaneously, second layer 82 is taken up by second roller 32. Upon a second rotation, third layer 83 is taken up by the continued rotation of first roller 31 in the counter-clockwise direction and fourth layer 84 is taken up by second roller 32. This alternating take-up sequence is correspondingly achieved along the inner diameter of the chamber 14 by winding the clockspring connector in the clockwise direction spooling first and second conductor cables 41,42 onto the hub 20.

It can be seen from the present invention that two flat conductor cables can be easily wound with minimal components incorporated within the clockspring housing and with minimal length of flat conductor cable. It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A clockspring connector comprising:

a clockspring housing;

a hub mounted within said housing;

a chamber defined by said housing;

a carrier member within said housing having a first roller and a second roller each mounted at a roller area having carrier member walls, said walls being fixed relative to said carrier member and partially surrounding said first and second rollers and closely adjacent a first turned-back loop and a second turned-back loop, respectively;

a first flat conductor cable having said first turned-back loop associated with said first roller; and a second flat conductor cable having said second turned-back loop associated with said second roller wherein rotation of said clockspring connector causes said first and second flat conductor cables at said first turned-back loop and said second turned-back loop to abut against said carrier member walls and cause the carrier member to rotate within said housing.

2. The clockspring connector of claim 1 wherein:

said hub includes an inner diameter exit cavity.

3. The clockspring connector of claim 1 wherein said housing includes an outer diameter exit cavity.

4. The clockspring connector of claim 1 wherein said carrier member is carried by said hub.

5. The clockspring connector of claim 1 wherein:

a base portion protrudes from said hub and said carrier member supported on said base portion.

6. The clockspring connector of claim 1 wherein:

said inner diameter exit cavity receiving said first and second flat conductor cables.

7. The clockspring connector of claim 1 wherein:

said outer diameter exit cavity receiving said first and second flat conductor cables.

8. The clockspring connector of claim 1 including:

a cover enclosing said housing and defining said chamber therein.

9. The clockspring connector of claim 1 wherein:

said inner diameter exit cavity receives a backbone;

said backbone having an entrance end and an opposed exit end;

said entrance end receiving said first and second flat conductor cables; and said exit end having insulated wires extending therefrom.

10. The clockspring connector of claim 1 including:

said outer diameter exit cavity having a backbone having an entrance end and an exit end;

said entrance end receiving said first and said second flat conductor cables; and said exit end having insulated wires exiting therefrom.

11. The clockspring connector of claim 1 wherein:

rotation of said hub from an unwound position causes said first flat conductor cable to be wound from the outer diameter of said chamber through said first turned-back loop around said first roller and wound onto said hub and simultaneously said second flat conductor cable being wound from said outer diameter of said chamber through said second turned-back loop around said second roller and wound onto said hub, alternatingly coiled with said first flat conductor cable; and rotation of said hub from its wound position causes said first flat conductor cable to be unwound from said hub through said first turned-back loop around said first roller to said outer diameter of said chamber and simultaneously said second flat conductor cable being unwound off of said hub through said second turned-back loop around said second roller to said outer diameter of said chamber, alternately coiling said second flat conductor cable with said first flat conductor cable between a housing wall and said carrier member.

12. The clockspring connector of claim 11 wherein: said first and second flat conductor cables are coiled at a second outer diameter of said chamber between said housing and nubs of said carrier member.

13. The clockspring connector of claim 1 wherein:

said hub is mounted upon a lip of said housing forming a first side of said chamber; and a cover mounted on said housing defining a second side of said chamber.

14. The clockspring connector of claim 1 wherein:

said flat conductor cables comprising twelve conductors.

15. The clockspring connector of claim 1 wherein:

said first conductor cable alternatingly coiled with said second conductor cable.

16. The clockspring connector of claim 1 wherein:

said first and second rollers are freely and independently rotatable from said carrier member.

17. The clockspring connector of claim 1 wherein:

said carrier member is freely and independently rotatable from said housing and said hub.

* * * * *

UNITED STATES PATENT AND TRADEMARK OFFICE
CERTIFICATE OF CORRECTION

PATENT NO. : 5,865,634
DATED : February 2, 1999
INVENTOR(S) : Gary Best

It is certified that error appears in the above-indentified patent and that said Letters Patent is hereby corrected as shown below:

On title page, add item [73]

ASSIGNEE: Methode Electronics, Inc.

ADDRESS: Chicago, IL

Signed and Sealed this

Fifth Day of October, 1999

Attest:

Q. TODD DICKINSON

*Attesting Officer*      *Acting Commissioner of Patents and Trademarks*